(12) United States Patent
Schelenz et al.

(10) Patent No.: US 11,159,011 B2
(45) Date of Patent: Oct. 26, 2021

(54) ELECTRIC CIRCUITS AND POWER SYSTEMS INCORPORATING THE SAME

(71) Applicant: GE Energy Power Conversion Technology Ltd, Rugby (GB)

(72) Inventors: Owen Jannis Schelenz, Berlin (DE); Markus Berndt, Berlin (DE); Dominik Hofmeyer, Berlin (DE)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 365 days.

(21) Appl. No.: 15/910,234

(22) Filed: Mar. 2, 2018

(65) Prior Publication Data
US 2018/0254628 A1    Sep. 6, 2018

(30) Foreign Application Priority Data

Mar. 3, 2017   (GB) ..................................... 1703467

(51) Int. Cl.
*H02J 3/18*   (2006.01)
*H02H 9/00*   (2006.01)
(Continued)

(52) U.S. Cl.
CPC ............... *H02H 9/001* (2013.01); *H02J 3/18* (2013.01); *H02J 3/382* (2013.01); *H02J 3/42* (2013.01); *H02M 7/125* (2013.01); *H02M 1/36* (2013.01)

(58) Field of Classification Search
CPC ......... H02H 9/001; H02H 9/002; H02J 3/382; H02J 3/42; H02J 3/18; H02J 3/38; H02M 7/125; H02M 1/36; H02M 1/32
See application file for complete search history.

(56) References Cited

U.S. PATENT DOCUMENTS 6,239,997 B1 *  5/2001  Deng ........................ H02J 3/38
                                                                363/95
7,638,983 B2 * 12/2009  Park .................... H02M 5/4585
                                                               290/44
(Continued)

FOREIGN PATENT DOCUMENTS

EP        1 858 147 A2    11/2007
WO      2016/146403 A1     9/2016

OTHER PUBLICATIONS

Galco.com " transformer", Jul. 11, 2012, pp. 1-3 (Year: 2012).*

(Continued)

*Primary Examiner* — Pinping Sun
(74) *Attorney, Agent, or Firm* — Wood IP LLC (57) ABSTRACT

The invention relates to a power system with an electric circuit connected between a power grid and a power source. The electric circuit includes a main power converter having main input terminals connected to the power source 16 by a DC link and output terminals. The main power converter is controlled by a controller. The electric circuit includes a main transformer having a primary winding 8a and a secondary winding, the primary winding being connected to the output terminals of the main power converter. Main switchgear is connected between the secondary winding of the main transformer and the power grid. An auxiliary transformer has a primary winding connected to the power grid in parallel with the main switchgear and a secondary winding connected to the controller. A pre-charge circuit is connected between the auxiliary transformer and the DC link.

15 Claims, 2 Drawing Sheets

(51) Int. Cl.
*H02J 3/42* (2006.01)
*H02M 7/12* (2006.01)
*H02J 3/38* (2006.01)
*H02M 1/36* (2007.01)

(56) References Cited

U.S. PATENT DOCUMENTS

| | | | | |
|---|---|---|---|---|
| 8,362,658 B2* | 1/2013 | Ahlborn | | H02M 7/72 307/151 |
| 8,693,228 B2* | 4/2014 | Matan | | H02M 7/48 363/97 |
| 2002/0030365 A1* | 3/2002 | Underwood | | H02J 3/38 290/40 B |
| 2004/0004404 A1* | 1/2004 | Eckardt | | H02M 7/537 307/140 |
| 2004/0164557 A1* | 8/2004 | West | | H02M 7/48 290/1 R |
| 2006/0186670 A1* | 8/2006 | Hudson | | H02P 9/48 290/44 |
| 2006/0196203 A1* | 9/2006 | Schnetzka | | F25B 49/025 62/228.4 |
| 2009/0284999 A1* | 11/2009 | Gibbs | | H02M 7/062 363/65 |
| 2010/0127576 A1* | 5/2010 | Ahlborn | | H02M 7/72 307/151 |
| 2011/0106470 A1* | 5/2011 | Yin | | H02J 3/01 702/58 |
| 2013/0208522 A1* | 8/2013 | Monjean | | H02M 1/10 363/142 |
| 2013/0241297 A1* | 9/2013 | Falk | | H02J 3/383 307/80 |
| 2013/0270916 A1* | 10/2013 | Larsen | | H02J 3/24 307/75 |
| 2013/0300116 A1* | 11/2013 | Egedal | | F03D 7/0296 290/44 |
| 2014/0091630 A1* | 4/2014 | Kim | | H02J 3/36 307/82 |
| 2014/0225369 A1* | 8/2014 | Bodewes | | F03D 9/11 290/44 |
| 2014/0300298 A1* | 10/2014 | Liu | | H02P 3/22 318/380 |
| 2015/0311813 A1* | 10/2015 | Gaudenz | | H02J 3/36 363/35 |
| 2016/0099572 A1* | 4/2016 | Gupta | | H02J 9/06 307/52 |
| 2016/0126858 A1* | 5/2016 | Wu | | H02M 7/125 363/89 |
| 2017/0093298 A1* | 3/2017 | Simms | | H02M 1/32 |
| 2017/0149366 A1* | 5/2017 | Gibbs | | H02M 1/40 |
| 2017/0222429 A1* | 8/2017 | Turner | | H02H 9/002 |
| 2017/0229907 A1* | 8/2017 | Hoffmann | | F03D 9/255 |
| 2018/0069404 A1* | 3/2018 | Schult | | H02M 7/125 |
| 2018/0358814 A1* | 12/2018 | Rates Palau | | H02J 3/1878 |
| 2019/0157982 A1* | 5/2019 | Brueckner | | H02M 7/797 |

OTHER PUBLICATIONS

Extended European Search Report and Opinion issued in connection with corresponding EP Application No. 18159658.6 dated Jun. 1, 2018.

Combined Search and Examination Report issued in connection with corresponding GB Application No. 1703467.9 dated Aug. 22, 2017.

* cited by examiner

ELECTRIC CIRCUITS AND POWER SYSTEMS INCORPORATING THE SAME

TECHNICAL FIELD

The present invention relates to electric circuits, and in particular to electric circuits for connecting one or more power sources or one or more loads to a power grid.

BACKGROUND OF THE INVENTION

Electric circuits for connecting a power source (or a group of power sources) to a power grid are well known. In one arrangement, an electric circuit is used to connect one or more direct current (DC) power sources, e.g., photovoltaic panels of a solar plant, to a power grid or network. The electric circuit includes a DC/AC power converter with DC input terminals and AC output terminals.

The DC input terminals are connected to the DC power sources by means of a DC link that typically includes one or more DC link capacitors.

The AC output terminals are connected to the power grid by means of an AC circuit that includes a step-up transformer. An AC filter is typically provided on the low voltage (LV) side of the step-up transformer, i.e., between the transformer and the AC output terminals of the power converter. Switchgear is typically provided on the medium voltage (MV) side of the step-up transformer, i.e., between the transformer and the power grid. In some arrangements, a circuit breaker can also be provided on the LV side of the step-up transformer, i.e., between the transformer and the power converter.

The AC circuit can have any suitable number of phases, but three phases would be typical.

It is sometimes advantageous to open the switchgear to disconnect the main power transformer from the power grid. For example, when the DC power sources are photovoltaic panels, the switchgear can be opened when the solar plant is not generating any electrical power (e.g., during the night) to avoid no-load transformer load losses. But closing the switchgear to reconnect the transformer to the power grid results in significant magnetising inrush currents which may be several times the rated transformer current. Various factors affect the magnitude and duration of the inrush currents, including residual flux in the transformer core, the magnetising characteristics of the transformer core, and the phase of the source voltage when the switchgear is closed etc. In addition, when the switchgear is opened, the sudden interruption of current can lead to over-voltages within the transformer windings, which over time can result in insulation breakdown. It is also important to pre-charge the DC link because otherwise the DC/AC power converter can suffer significant damage.

Repeatedly exposing the transformer to inrush currents by regularly closing the switchgear (e.g., each morning so that the solar plant can supply electrical power to the power grid) can seriously degrade the mechanical integrity of the transformer. The power grid can also experience undesirable inrush spikes that can affect power quality.

Accordingly, there is a need for an improved electric circuit which allows the DC link to be pre-charged and which reduces magnetising inrush currents when the switchgear is closed.

There is also a need for an improved electric circuit which ensures continuity of power supply for operation-critical electronic components and other equipment associated with the DC/AC power converter when the switchgear is open.

SUMMARY OF THE INVENTION

The present invention provides an electric circuit connectable between a power grid and one or more power sources or one or more loads, the electric circuit including:
  a main power converter having first main terminals connectable to the one or more power sources or one or more loads, and second main terminals, the main power converter being associated with one or more electrical components (e.g., electrical components that are used to control the main power converter or are directly associated in some way with its operation, including inter alia controllers, relays, testing equipment, communication equipment, supervisory control and data acquisition equipment etc.);
  a main transformer having a primary winding and a secondary winding, the primary winding being connected to the second main terminals of the main power converter;
  main switchgear connected to the secondary winding of the main transformer and connectable to the power grid; and
  an auxiliary transformer having a primary winding connectable to the power grid in parallel with the main switchgear and a secondary winding connected to the one or more electrical components to provide power to the one or more electrical components.

It will be understood that, unless otherwise stated, any reference herein to components of the electric circuit being 'connected' includes both a direct and an indirect electrical connection or coupling, e.g., with the option for components to be electrically connected or coupled together by means of one or more interposing components.

In one arrangement, the main power converter is a DC/AC power converter that can be operated, during normal operation, as an inverter to provide electrical power from the one or more power sources to the power grid or as an active rectifier to provide electrical power from power grid to the one or more loads. The first main terminals of the DC/AC power converter are DC terminals that are connectable to the one or more power sources or the one or more loads by a DC link. The one or more power sources can be DC power sources (e.g., photovoltaic panels of a solar farm) or DC loads. Alternatively, the one or more power sources can be AC power sources or AC loads if connected to the DC link by means of a power converter. The second main terminals of the DC/AC power converter are AC terminals that are connectable to the power grid (e.g., an AC power grid or supply network) by means of the main transformer and the main switchgear.

The one or more electrical components will typically be supplied with AC power. If the one or more electrical components are integrated with the power converter, the power converter can include AC auxiliary terminals that are connected to the secondary winding of the auxiliary transformer and configured to supply AC power from the auxiliary transformer to the one or more electrical components associated with the main power converter. The one or more electrical components will continue to receive AC power even when the main transformer is disconnected from the power grid, i.e., when the main switchgear is open. This ensures that the main power converter can still execute essential control, testing and communication functions etc. when the main switchgear is open. The auxiliary transformer can also supply power to other electrical loads, e.g., service loads for operating the heating, cooling, lighting and ventilation for a pre-assembled power station skid or electrical house (E-house) that houses the circuit components. Electrical components and/or electrical loads can be supplied with DC power if connected to the secondary winding of the auxiliary transformer by means of a power converter.

The power converter can have any suitable construction (two-level, three-level, multi-level etc.) and can include a plurality of controllable semiconductor switches controlled using a suitable control strategy to provide appropriate power flow through the electric circuit during normal operation, and preferably also during a pre-charge process and a pre-magnetisation and synchronisation process.

The one or more electrical components mentioned above can include a controller for controlling the operation of the main power converter (i.e., for controlling the switching of the controllable semiconductor switches), the opening and closing of the main switchgear and optionally any other circuit contactors etc. The controller can be a single integrated controller or a group of separate, but inter-connected, controllers that can be used to provide a coordinated control of the electric circuit.

The electric circuit can include a pre-charge circuit connected between the DC link and the secondary winding of the auxiliary transformer. The pre-charge circuit allows the power grid to pre-charge the DC link by means of the auxiliary transformer. This can be particularly useful if the one or more power sources are photovoltaic (PV) panels, for example, which cannot be used to pre-charge the DC link during the night, or if the electric circuit is connected to one or more loads. The pre-charge circuit includes a pre-charge power converter. The pre-charge power converter can be an AC/DC power converter having any suitable construction, operated as an active rectifier and including a plurality of controllable semiconductor switches controlled using a suitable control strategy. Alternatively, the pre-charge power converter can be a passive rectifier such as a diode bridge, for example.

The pre-charge circuit can include one or both of an AC contactor which can be used to isolate the pre-charge circuit from the auxiliary transformer (e.g., located on the AC-side of the pre-charge power converter) and a DC contactor which can be used to provide isolation from the DC link (e.g., located on the DC-side of the pre-charge power converter). A DC fuse can also be provided in the DC link or the pre-charge circuit to protect against main power converter failure. The pre-charge circuit can include a resistor (e.g., a current limiting resistor) to help reduce the rating of the AC contactor, the pre-charge power converter and the DC fuse by limiting the pre-charge current.

For the purposes of the present discussion, the electric circuit can be divided conceptually into four circuit parts, namely a main AC circuit, auxiliary AC circuit, the pre-charge circuit and the DC link that connects the main power converter to the one or more power sources or one or more loads.

The main AC electric circuit includes the main switchgear, the main transformer and the main power converter and can have any suitable number of phases. Three phases might be typical. In one arrangement, the main transformer is a three-phase transformer and the main power converter is a three-phase power converter. The main transformer can have any suitable construction (e.g., delta-delta, delta-wye etc.) and can be a step-up transformer with a low voltage (LV) on the primary winding-side and a medium voltage (MV) on the secondary winding-side. In one arrangement, the main transformer can be a multi-winding transformer with a plurality of primary windings and one secondary winding. One of the primary windings would be connected to the second main terminals of the main power converter and the other primary windings could be connected to any suitable electric circuit. The main power converter can be used to pre-magnetise the main transformer for all connected electric circuits.

The main switchgear can be MV switchgear that is controlled to open and close in response to commands from a controller.

The main AC circuit can include one or more filters, e.g., line filters, electromagnetic interference (EMI) filters etc., optionally connected between the main transformer and the main power converter.

The auxiliary AC circuit includes the auxiliary transformer and is connected between the power grid and the one or more electrical components. The auxiliary transformer can have any suitable construction and can be a step-down transformer to provide an LV power supply to the one or more electrical components associated with the main power converter and any additional connected electrical loads (see above). In other words, the auxiliary transformer can have a MV on the primary winding-side and a LV on the secondary winding-side.

In one arrangement, the primary winding of the auxiliary transformer can be connectable to the power grid, optionally by means of the common bus of the main switchgear, without any means for selectively isolating it from the power grid. However, it is possible to include auxiliary switchgear (e.g., MW switchgear) or some other means for selectively isolating the auxiliary transformer (and hence the auxiliary AC circuit as a whole) from the power grid if appropriate.

The pre-charge circuit can be connected to the auxiliary AC circuit, e.g., connected on the LV-side of the auxiliary transformer. More particularly, the pre-charge circuit can be connected between the auxiliary AC circuit and the DC link.

The DC link that connects the main power converter to the one or more power sources or the one or more loads can include a DC contactor or any other means for selectively isolating the power main converter from the one or more power sources or the one or more loads. The DC contactor can be motorised in some arrangements. The DC contactor is normally controlled to open during pre-charge to isolate the one or more power sources or the one or more loads from the DC link. The DC link can also include one or more DC link capacitors.

The present invention further provides a power system including:
  one or more power sources or one or more loads;
  a power grid; and
  an electric circuit as described above, wherein the first main terminals of the main power converter are connected to the one or more power sources or the one or more loads, the main switchgear is connected to the power grid, and the primary winding of the auxiliary transformer is connected to the power grid in parallel with the main switchgear.

In one arrangement, each power source is a DC power source, e.g., a PV panel that might form part of a solar plant. The first main terminals of the main power converter are DC terminals connected to the one or more DC power sources by a DC link.

In one embodiment, the invention further provides a method of operating the power system as described above, including, with the main switchgear open, supplying power from the power grid to the one or more electrical components associated with the main power converter through the auxiliary transformer.

The method therefore provides for electrical power to be supplied to the one or more electrical components (and any other connected electrical loads) when the main switchgear is open.

The invention further provides a method of pre-charging and pre-magnetising the power system described above, where the electrical circuit includes the pre-charge circuit, the method including:

- with the main switchgear open, supplying power from the power grid to the DC link (e.g., by means of the auxiliary AC circuit and the pre-charge circuit) to pre-charge the DC link;
- operating the main power converter to supply reactive power to the main transformer to at least partially magnetise the main transformer to derive a voltage at the secondary winding of the main transformer; and
- closing the main switchgear when the voltage at the secondary winding of the main transformer has substantially the same parameter(s) (e.g., one or more of frequency, phase and magnitude) as the power grid voltage.

The method therefore provides for a 'soft-start' of the electric circuit by pre-charging the DC link and pre-magnetising the main transformer and synchronising the main transformer voltage to the power grid voltage before the main switchgear is closed to connect the main AC circuit to the power grid. Consequently, the main switchgear can be opened regularly to isolate the main transformer from the power grid (e.g., to avoid no-load losses) without suffering from the problems caused by magnetising inrush currents when the main switchgear is closed. If the one or more power sources are PV panels, the main switchgear can be opened every night and closed every morning, for example.

The DC contactor in the DC link will normally be closed during normal operation (even at night if the one or more power sources are PV panels) and needs to be opened to isolate the DC link from the one or more power sources or the one or more loads before the DC link can be pre-charged. A preliminary check can be made to see if the DC link is already charged sufficiently before it is pre-charged from the power grid by means of the pre-charge circuit. If the one or more power sources are PV panels, and the DC link is not sufficiently charged, the only option during the night is to charge the DC link using the pre-charge circuit.

Electrical power from the power grid is supplied to the DC link through the auxiliary AC circuit and the pre-charge circuit until the DC link is charged sufficiently.

The step of operating the main power converter to supply reactive power to the main transformer to at least partially magnetise the main transformer can include:

- measuring, calculating or otherwise deriving parameter(s) of the power grid voltage to provide one or more parameter references;
- measuring, calculating or otherwise deriving the corresponding parameter(s) of the transformer voltage at the secondary winding of the main transformer, i.e., on the MV-side of the main transformer; and
- operating the main power converter to supply reactive power to the main transformer in a controlled manner (e.g., with a ramped increase or otherwise) until the error between the measured parameter(s) of the transformer voltage and the one or more parameter references is reduced below a predetermined level.

A command can be issued to close the main switchgear when the error between the measured parameter(s) of the transformer voltage and the one or more parameter references is reduced below the predetermined level. The parameter(s) of the voltage at the secondary winding of the main transformer will preferably be substantially the same as the corresponding parameters of the power grid voltage so that only minimal inrush currents will be experienced. In practical terms, the inrush currents can typically be kept within manageable limits if the error is less than about 10%, or more preferably less than about 5% of the power grid voltage.

In one arrangement, the parameter(s) of the transformer voltage at the secondary winding of the auxiliary transformer (i.e., on the LV-side of the auxiliary transformer) can be measured or determined from measurements taken using suitable sensors. The corresponding parameter(s) of the transformer voltage at the primary winding of the auxiliary transformer (i.e., on the MV-side of the auxiliary transformer) can be calculated or otherwise derived from the LV-side measurements in a known manner, e.g., by compensating for turns ratio, winding configuration (removing phase shifts if appropriate) etc. The calculated or derived parameter(s) are used as the one or more reference parameters and are taken to correspond to the parameter(s) of the power grid voltage to which the primary winding of the auxiliary transformer is connected.

Similarly, the parameter(s) of the transformer voltage at the primary winding of the main transformer (i.e., on the LV-side of the main transformer) can be measured or determined from measurements taken using suitable sensors. The corresponding parameter(s) of the transformer voltage at the secondary winding of the main transformer (i.e., on the MV-side of the main transformer) can be calculated or otherwise derived from the LV-side measurements in a known manner.

There can often be practical and cost advantages in taking measurement on the LV-side of the respective transformer and using those measurements to calculate or otherwise derive one or more corresponding voltage parameters on the MV-side. But in another arrangement, the parameters of the respective transformer voltages can be measured or determined from measurements taken on the MV-side using suitable sensors. In yet another arrangement, the parameters of the power grid voltage can be measured or determined from measurements using suitable sensors.

Measurements taken by the sensors can be provided to the controller for the main power converter to control the pre-magnetisation and synchronisation process.

The sensors can include one or more instrument transformers, e.g., current transformers (CTs) and potential transformers (PTs), or any other suitable sensor.

During the pre-magnetisation and synchronisation process, the switching of the controllable semiconductor switches of the main power converter can be controlled by a suitable control strategy, e.g., a modified version of feedforward control or closed loop control, which aims to reduce the error between the measured parameter(s) of the transformer voltage and the one or more parameter references to below a predetermined level, and preferably to as close as zero as possible, to enable the main switchgear to be closed safely.

Once the main switchgear is closed, the power flow through the pre-charge circuit to the DC link can be stopped, e.g., by opening one or both of the AC and DC contactors in the pre-charge circuit. The DC contactor in the DC link is closed to connect the one or more power sources or the one or more loads to the main power converter. With the one or more power sources or the one or more loads brought on-line, power flows through the main AC circuit from the one or more power sources to the power grid or from the power grid to the one or more loads in the usual way. In one arrangement where the main power converter is an AC/DC power converter, it is operated as an inverter to control power flow from one or more power sources to the power grid or as active rectifier to control power flow from the power grid to the one or more power sources. After the main switchgear is closed, the main power converter can continue to provide reactive power for the main transformer and any filters in the main AC circuit, or allow the reactive power to be provided by the power grid and concentrate on the production of active power.

In one embodiment, the invention further provides a method of operating the power system as described above, including:

with the main switchgear closed, operating the main power converter to supply reactive power to the main transformer to achieve substantially unity power factor at the main switchgear;

opening the main switchgear;

operating the main power converter to decrease the supply of reactive power to substantially zero; and shutting down the main power converter.

The method can be used to protect the main transformer against voltage spikes when the main switchgear is opened. The switching of the controllable semiconductor switches of the main power converter can be controlled by a suitable control strategy.

DETAILED DESCRIPTION OF THE INVENTION

Figure 1:
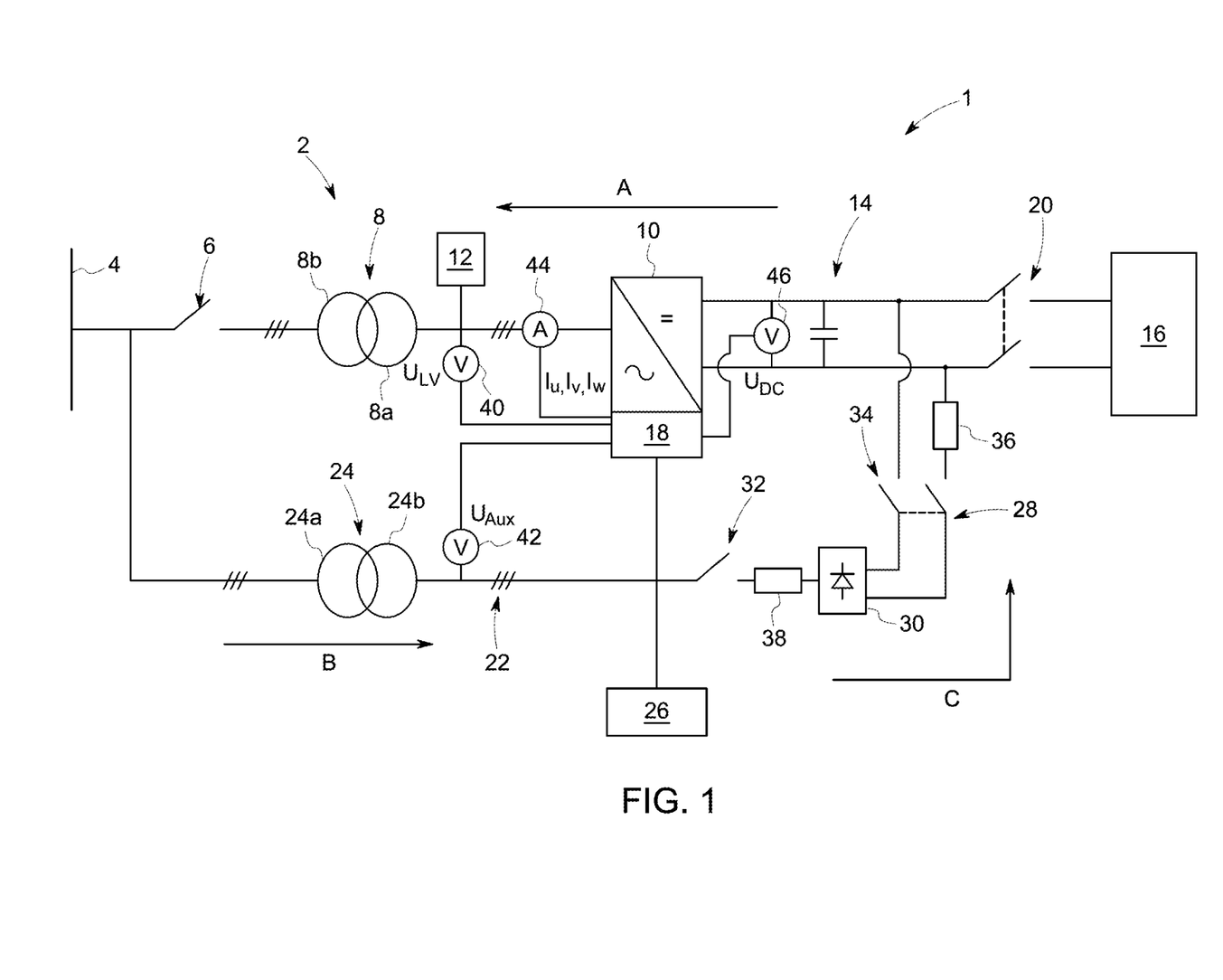
FIG. 1 is a schematic diagram of a power system according to an embodiment.

With reference to FIG. 1, a power system 1 according to the present invention includes an electric circuit connected between an AC power grid 4 carrying a medium voltage (MV) distribution voltage and a DC power source in the form of the solar farm 16. Although not shown, it will be readily understood that the electric circuit can also be connected to other types of power source or to one or more loads, e.g., as a drive circuit.

The electric circuit includes a main AC circuit 2 that is connected to the AC power grid 4. The main AC circuit 2 is a three-phase circuit and includes MV switchgear 6, a main transformer 8 having a primary winding 8a and a secondary winding 8b, and a DC/AC power converter 10. The main transformer 8 is a step-up transformer which receives LV electrical power from the DC/AC power converter 10 at the primary winding 8a and derives MV electrical power at the secondary winding 8b which is supplied to the AC power grid 4.

The main AC circuit 2 include filters 12 that are connected between the main transformer 8 and the DC/AC power converter 10.

The DC/AC power converter 10 includes main AC output terminals that are connected to the main AC circuit 2.

The electric circuit also includes a DC link 14 that is connected between main DC input terminals of the DC/AC power converter 10 and the solar farm 16. The solar farm 16 includes a plurality of photovoltaic (PV) panels that convert solar energy into DC electrical power. The DC link 14 includes one or more DC capacitors and a DC contactor 20 (optionally a motorised switch) that can be opened to selectively isolate the solar farm 16 from the DC link. The DC contactor 20 will normally remain closed, even during the night.

It will be readily understood that the normal power flow direction through the main AC circuit 2 and the DC link 14 (represented by arrow A) is from the solar farm 16 to the AC power grid 4. The DC/AC power converter 10 can have any suitable construction and will typically include a plurality of controllable semiconductor switches that can be opened and closed under the control of a controller 18. During daylight hours, when the solar farm 16 is converting solar energy into DC electrical power, the DC/AC power converter 10 will normally be operated as an inverter to control power flow from the solar farm to the AC power grid 2.

The controller 18 can be one of a plurality of electrical components that are used to control the DC/AC power converter or are directly associated in some way with its operation, including inter alia other controllers, relays, testing equipment, communication equipment, supervisory control and data acquisition equipment etc. In some arrangements, these electrical components can receive electrical power directly from the DC/AC power converter 10 when it is operating normally, i.e., to control power flow from the solar farm 16 to the AC power grid 2. But it will be readily appreciated that the solar fain 16 will only provide electrical power during daylight hours and that it is advantageous to open the switchgear 6 during the night to avoid no-load transformer load losses. Consequently, during the night, the electrical components 18 cannot receive electrical power from either the solar farm 16 or the AC power grid 4; in the latter case because the main AC circuit 2 is isolated from the AC power grid by the open switchgear 6.

In order to provide electrical power to the controller 18 and the other electrical components during the night, the electric circuit includes an auxiliary AC circuit 22. The auxiliary AC circuit 22 is a three-phase circuit and includes an auxiliary transformer 24 with a primary winding 24a and a secondary winding 24b. The auxiliary transformer 24 is a step-down transformer which receives MV electrical power from the AC power grid 4 at the primary winding 24a and derives LV electrical power at the secondary winding 24b for the electrical components 18. The auxiliary AC circuit 22 is connected to the common bus of the switchgear 6 (but in other arrangements could also be connected separately to the AC power grid 4 or even to a separate power source) and to the controller 18. In some arrangements the auxiliary AC circuit 22 can be connected to an auxiliary AC input terminal of the DC/AC power converter 10 which allows LV electrical power to be provided to an integrated controller or other associated electrical components.

During the night, electrical power is therefore provided to the controller 18 and the other associated electrical components by means of the auxiliary AC circuit 22 so that operation-critical or essential functions for the DC/AC power converter 10 such as control, communication, data acquisition etc., can be maintained at all times.

The auxiliary AC circuit 22 can also supply LV electrical power to other electrical loads which are indicated generally in FIG. 1 by reference sign 26. Electrical loads 26 can include service loads for operating the heating, cooling, lighting and ventilation for a pre-assembled power station skid or electrical house (E-house) that houses the circuit components, for example.

It will be readily understood that the normal power flow direction through the auxiliary AC circuit 22 (represented by arrow B) is from the AC power grid 4 to the controller 18 and the other electrical loads 26.

The electric circuit also includes a pre-charge circuit 28 that is connected between the auxiliary AC circuit 22 and the DC link 14. The pre-charge circuit 28 includes a diode rectifier 30. In some arrangements the pre-charge circuit can include an AC/DC power converter with controllable semiconductor switches instead of the diode rectifier. The pre-charge circuit 28 also includes an AC contactor 32 for selectively isolating the diode rectifier 30 from the auxiliary AC circuit 22 and a DC contactor 34 for selectively isolating the diode rectifier from the DC link 14. A fuse 36 provides protection against failure of the DC/AC power converter 10. A resistor 38 is provided between the AC contactor 32 and the diode rectifier 30 to limit the pre-charge current. Although not shown, the pre-charge circuit can also include a pre-charge transformer to step-up the voltage for the purposes of charging the DC link to the level necessary for pre-magnetising the main transformer. The pre-charge transformer could optionally be implemented as an additional winding on the auxiliary transformer 24.

It will be readily understood that the normal power flow direction through the pre-charge circuit 28 (represented by arrow C) is from the AC power grid 4 to the DC link 14 by means of the auxiliary AC circuit 22.

The switchgear 6 and the various contactors (or switches) can be controlled to open and close by a controller that can optionally be integrated or coordinated with the controller 18.

Voltage sensors 40 are located on the LV-side of the main transformer 8 and measure the voltage $U_{LV}$ at the primary winding 8a. Voltage sensors 42 are located on the LV-side of the auxiliary transformer 24 and measure the voltage $U_{Aux}$ at the secondary winding 24b. Current sensors 44 measure the output currents $I_v$, $I_w$ and $I_w$ of the DC/AC power converter 10. Voltage sensors 46 measure the DC link voltage $U_{DC}$. The voltage and current measurements from the various sensors are provided to the controller 18 for the DC/AC power converter 10 to control the switching of the semiconductor switches. Although not shown, sensors can also be located on the MV-side of main transformer and/or the MV-side of the auxiliary transformer 24 or at any other suitable location for providing AC power grid parameter measurement.

Operation of the power system during pre-charge and pre-magnetisation will now be described in a situation where the PV panels cannot be used to pre-charge the DC link.

The main switchgear 6 will be open during the pre-charge process.

The DC contactor 20 is opened to isolate the solar farm 16 from the DC link 14.

The AC and DC contactors 32, 34 in the pre-charge circuit 28 are closed.

The DC link 14 is pre-charged by supplying power to the DC link from the power grid 4 by means of the auxiliary AC circuit 22 and the pre-charge circuit 28.

Once the DC link 14 is pre-charged to the desired level, the main power converter 10 is operated to supply reactive power to the main transformer 8 to at least partially magnetise it. A suitable control strategy for the main power converter 10 during the pre-magnetisation and synchronisation process is described with reference to FIG. 2. The control strategy is used to control active and reactive power flow with respect to the direct (d) axis and quadrature (q) axis, respectively. It will be readily understood that other control strategies can be used.

Figure 2:
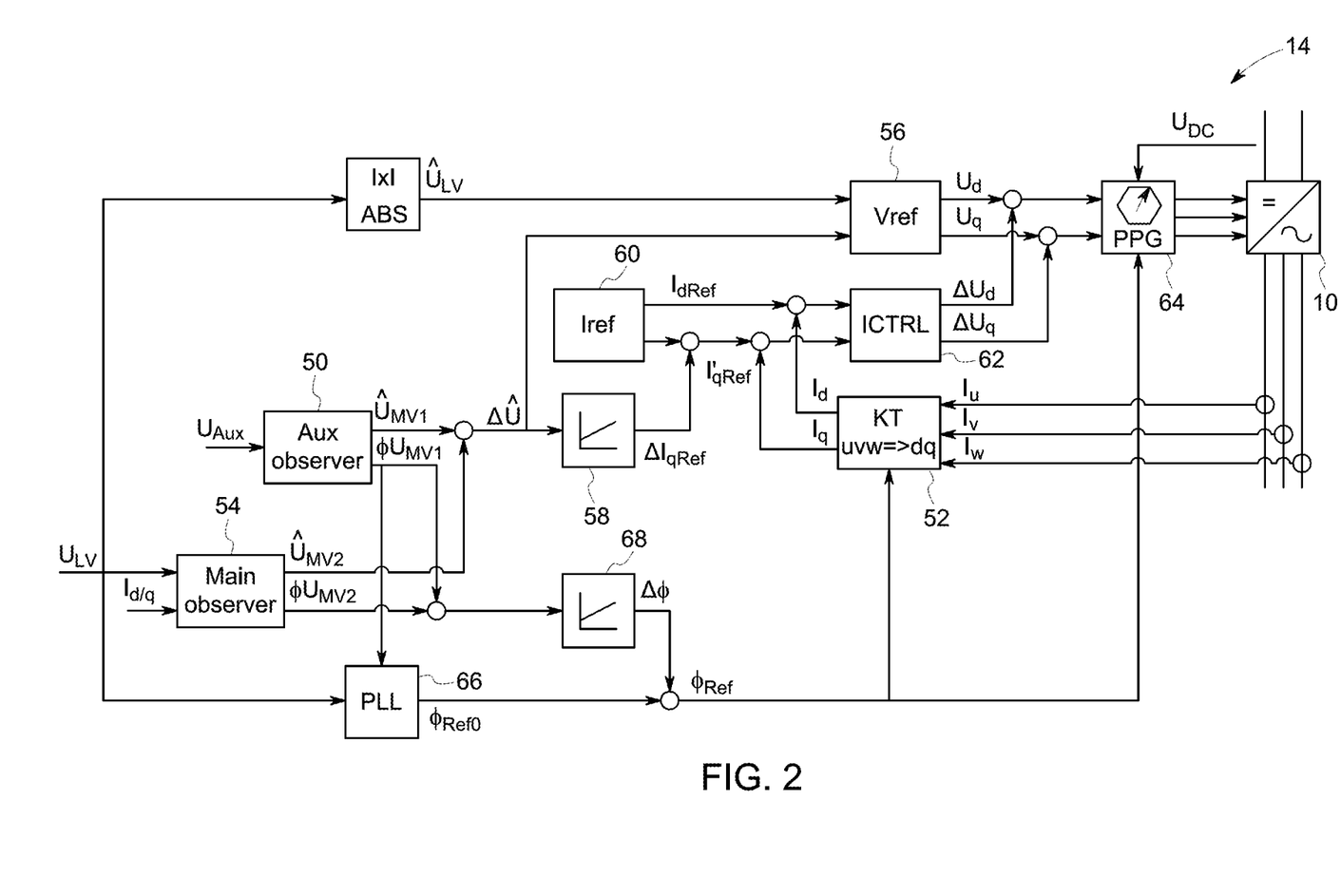
FIG. 2 is a schematic of a controller for the main power converter of the power system of FIG. 1.

The controller 18 for the main power converter 10 includes an auxiliary observer 50 which uses the parameterised typical load current of the auxiliary transformer 22 and the measured voltage $U_{Aux}$ at the secondary winding 22b of the auxiliary transformer (i.e., on the LV-side) to derive a voltage magnitude $\hat{U}_{MV1}$ of the grid voltage at the primary winding 22a of the auxiliary transformer and its phase angle $\Phi U_{MV1}$.

The controller 18 also includes a coordinate transformation module 52 which uses the measured output currents $I_v$, $I_w$ and $I_w$ of the DC/AC power converter 10 to calculate actual d-axis and q-axis currents $I_d$ and $I_q$ in the dq reference frame.

A main observer 54 uses the measured voltage $U_{LV}$ at the primary winding 8a of the main transformer 8 (i.e., on the LV-side) and the actual d-axis and q-axis currents $I_d$ and $I_q$ to derive a voltage magnitude $\hat{U}_{MV2}$ at the secondary winding 8b of the main transformer and its phase angle $\Phi U_{MV2}$.

The auxiliary and main observers 50, 54 are derived from the equivalent circuits of the auxiliary and main transformers 22, 8, respectively.

The difference $\Delta \hat{U}$ between the voltage magnitudes $U_{MV1}$ and $U_{MV2}$ is calculated and is used to calculate feed forward voltage control references $U_d$ and $U_q$ in the dq reference frame. In particular, the difference $\Delta \hat{U}$ is provided to a voltage controller 56 which also receives a voltage magnitude $\hat{U}_{LV}$, i.e., the magnitude of the measured voltage $U_{LV}$. The voltage controller 56 uses the difference $\Delta \hat{U}$ and the voltage magnitude $\hat{U}_{LV}$ to calculate voltage control references $U_d$ and $U_q$.

The difference $\Delta \hat{U}$ between the voltage magnitudes $U_{MV1}$ and $U_{MV2}$ is also provided to a synchronisation magnitude controller 58 which provides an output $\Delta I_{qref}$. A reference module 60 provides a d-axis reference current $I_{dRef}$ and an initial q-axis reference current which is summed with the output $\Delta I_{qref}$ of the synchronisation magnitude controller 58 to derive a q-axis reference current $I_{qRef}$. It will be understood that the synchronisation magnitude controller 58 is used to modify the reference current for the q-axis in order to achieve reactive power control. Active power control can be carried out on the basis of the d-axis reference current $I_{dRef}$ provided by the reference module 60 without such modification.

The difference between the d-axis reference current $I_{dRef}$ and the actual d-axis current $I_d$ calculated by the coordinate transformation module 52 is calculated and provided to a current controller 62. Similarly, the difference between the q-axis reference current $I_{qRef}$ and the actual q-axis current $I_q$ calculated by the coordinate transformation module 52 is calculated and provided to the current controller 62. The current controller 62 calculates voltage control references $\Delta U_d$ and $\Delta U_q$.

The respective voltage control references for the d-axis (i.e., $U_d$ and $\Delta U_d$) provided by the voltage and current controllers 56, 62 are summed together and provided to a pulse pattern generator 64. Similarly, the respective voltage control references for the q-axis (i.e., $U_q$ and $\Delta U_q$) provided by the voltage and current controllers 56, 62 are summed together and provided to the pulse pattern generator 64. The pulse pattern generator 64 also received a measured voltage $U_{DC}$ at the DC link 14 and a corrected reference angle $\Phi_{Ref}$ the derivation of which will now be described.

A phase locked loop (PLL) 66 uses the measured voltage $U_{LV}$ to derive a reference angle $\Phi_{Ref0}$ for the rotating reference frame. The PLL 66 can be initialised using the phase angle $\Phi U_{MV1}$ calculated by the auxiliary observer 50.

The difference between the phase angles $\Phi U_{MV1}$ and $\Phi U_{MV2}$ is calculated and provided to a synchronisation angle controller 68 which provides an output $\Delta\Phi$. The output $\Delta\Phi$ of the synchronisation angle controller 68 is summed with the reference angle $\Phi_{Ref0}$ to derive the corrected reference angle $\Phi_{Ref}$ that is provided to the pulse pattern generator 64 and the coordinate transformation module 52 to calculate the actual d-axis and q-axis currents $I_d$ and $I_q$.

The pulse pattern generator 64 uses the measured DC link voltage $U_{DC}$ to control modulation. The firing angle is calculated by the pulse pattern generator 64 using the summed control references for the d-axis and q-axis (i.e., $(U_d+\Delta U_d)$ and $(U_q+\Delta U_q)$, and the corrected reference angle $\Phi_{Ref}$.

The synchronisation magnitude controller and synchronisation angle controller 58, 68 operate to bring the magnitude and angle of the voltage $U_{MV2}$ at the secondary winding 8b of the main transformer 8 to be substantially the same as the magnitude and angle of the voltage $U_{MV1}$ at the primary winding 22a of the auxiliary transformer 22 (which in turn is the same as the grid voltage).

Once the voltage over the main switchgear 6 is within acceptable limits (but preferably as close to zero as possible), the main switchgear can be controlled to close. The synchronisation controllers can be locked and the current control parameters can be adjusted for normal operation of the power system 1, i.e., where power is supplied from the solar farm 16 to the power grid 4.

The invention claimed is:

1. An electric circuit connectable between a power grid and one or more power sources or one or more loads, the electric circuit comprising:
   a main power converter including a DC/AC power converter having first main terminals connectable to the one or more power sources or the one or more loads by a DC link and second main terminals, the main power converter being associated with one or more electrical components including a controller configured to control the main power converter;
   a main transformer having a main primary winding and a main secondary winding, the main primary winding being connected to the second main terminals of the main power converter;
   a main switchgear connected to the main secondary winding of the main transformer and connectable to the power grid;
   an auxiliary transformer having an auxiliary primary winding connected directly to the power grid and in parallel with the main switchgear and an auxiliary secondary winding connected to the controller,
   a pre-charge circuit connected between the DC link and the secondary winding of the auxiliary transformer, and comprising an AC contactor selectively operable to isolate the pre charge circuit from the auxiliary transformer and a DC contactor selectively operable to isolate the pre-charge circuit from the DC link, wherein during a pre-charge process the AC contactor and DC contactor are closed,
   wherein the controller is configured to control operation of the main power converter and opening and closing of the main switchgear during normal operation and during a pre-charge process and a pre-magnetization and synchronization process, the electric circuit, using the controller is configured for:
   with the main switchgear open, supplying power from the power grid to the one or more electrical components associated with the main power converter through the auxiliary transformer;
   with the main switchgear open, suppling power from the power grid to the DC link to with the main switchgear open, operating the main power converter to supply reactive power to the main transformer to at least partially magnetize the main transformer to derive a voltage at the secondary winding of the main transformer; and
   closing the main switchgear when the voltage at the secondary winding of the main transformer has substantially the same parameters as a power grid voltage, and wherein when operating normally, power is transmitted from the one or more power sources to the one or more electrical components via the main power converter during daylight hours, and during night, power supply is switched from the one or more power sources wherein a contactor at the one or more power sources is open and the auxiliary transformer is configured to supply power from the power grid to the one or more electrical components including the controller and to the one or more loads.

2. The electric circuit according to claim 1, wherein the main power converter including a plurality of controllable semiconductor switches, wherein the first main terminals of the DC/AC power converter are DC terminals that are connectable to the one or more power sources or the one or more loads by means of the DC link, and wherein the second main terminals of the DC/AC power converter are AC terminals that are connectable to the power grid by means of the main transformer and the main switchgear.

3. The electric circuit according to claim 2, wherein the DC link includes a second DC contactor operable to selectively isolate the one or more power sources or the one or more loads from the DC link.

4. The electric circuit according to claim 2, wherein the DC link includes one or more capacitors.

5. The electric circuit according to claim 1, wherein the pre-charge circuit includes a pre-charge power converter.

6. The electric circuit according to claim 5, wherein the pre-charge power converter is an AC/DC power converter including a second plurality of controllable semiconductor switches.

7. The electric circuit according to claim 5, wherein the pre-charge power converter is a passive rectifier.

8. The electric circuit according to claim 1, wherein the pre-charge circuit includes a resistor.

9. The electric circuit according to claim 1, wherein the pre-charge circuit includes a DC fuse.

10. The electric circuit according to claim 1, wherein the main transformer is a step-up transformer with a first voltage on the main primary winding and a second voltage higher than the first voltage on the main secondary winding.

11. The electric circuit according to claim 1, further comprising one or more filters.

12. The electric circuit according to claim 1, wherein the auxiliary transformer is a step-down transformer with a first voltage on the auxiliary primary winding and a second voltage lower than the first voltage on the auxiliary secondary winding.

13. A power system comprising:
   the one or more power sources or the one or more loads;
   the power grid; and an electric circuit according to claim 1, wherein the first main terminals of the main power converter are connected to the one or more power sources or the one or more loads, the main switchgear is connected to the power grid, and the auxiliary primary winding of the auxiliary transformer is connected to the power grid in parallel with the main switchgear.

14. A method of pre-charging and pre-magnetising the power system according to claim 13, wherein operating the main power converter to supply reactive power to the main transformer to at least partially magnetise the main transformer further comprises:

measuring, calculating or otherwise deriving parameter(s) of the power grid voltage to provide one or more parameter references;

measuring, calculating or otherwise deriving corresponding parameter(s) of the transformer voltage at the main secondary winding of the main transformer; and operating the main power converter to supply reactive power to the main transformer in a controlled manner until an error between the measured parameter(s) of the transformer voltage and the one or more parameter references are reduced below a predetermined level.

15. The method of operating the power system according to claim 13, the method comprising:

with the main switchgear closed, operating the main power converter to supply reactive power to the main transformer to achieve substantially unity power factor at the main switchgear;

opening the main switchgear;

operating the main power converter to decrease the supply of reactive power to substantially zero; and shutting down the main power converter.

* * * * *